United States Patent [19]

Sikorra

[11] 4,196,632
[45] Apr. 8, 1980

[54] DUAL CAPACITANCE TYPE BONDED PRESSURE TRANSDUCER

[75] Inventor: Charles F. Sikorra, Seattle, Wash.

[73] Assignee: The Boeing Company, Seattle, Wash.

[21] Appl. No.: 933,458

[22] Filed: Aug. 14, 1978

[51] Int. Cl.² .............................................. G01L 9/12
[52] U.S. Cl. ...................................... 73/718; 361/283
[58] Field of Search .................. 73/724, 718; 361/283

[56] References Cited

U.S. PATENT DOCUMENTS

| 3,027,769 | 4/1962 | Coon | 361/283 |
|---|---|---|---|
| 3,405,559 | 10/1968 | Moffatt | 73/724 |
| 3,645,137 | 2/1972 | Hazen | 73/718 |
| 4,064,549 | 12/1977 | Cretzler | 73/724 |

Primary Examiner—Donald O. Woodiel
Attorney, Agent, or Firm—Cole, Jensen & Puntigam

[57] ABSTRACT

The apparatus includes first and second support elements of fused quartz and an intermediately positioned thin diaphragm of the same material. Each support element has a recess in one surface which defines a support surface. The support elements are oriented so that the support surfaces contact and support opposite surfaces of the diaphragm. There are openings in each support element which extend between the recess and the exterior of the element, through which openings a reference pressure and the pressure to be measured are directed. The support surfaces of the support elements and the diaphragm are bonded together so as to form a dimensionally stable, unitized apparatus. Thin film capacitor plates are provided on both surfaces of the diaphragm and in the recesses of both support elements to define two capacitors. Electrically conductive leads extend from the capacitor plates to the exterior of the apparatus, so that the capacitance of the capacitors can be measured.

13 Claims, 6 Drawing Figures

U.S. Patent  Apr. 8, 1980  Sheet 1 of 2  4,196,632
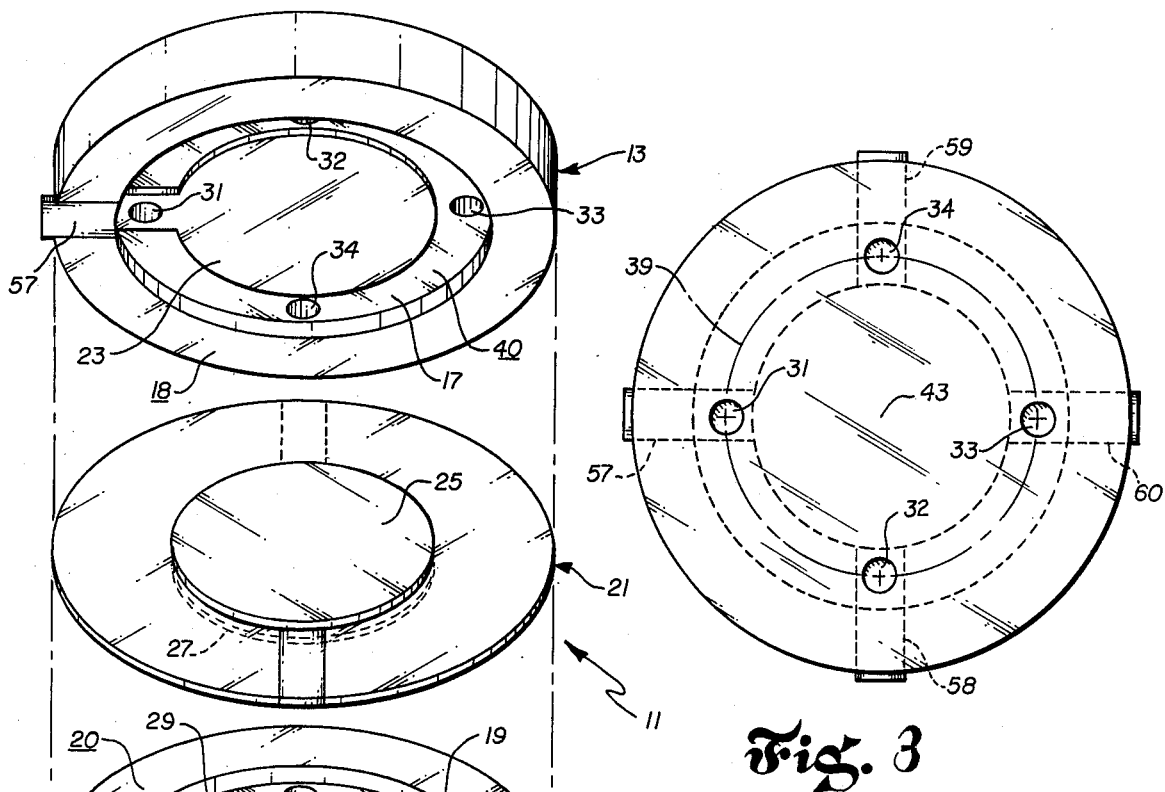
Fig. 1
Fig. 3
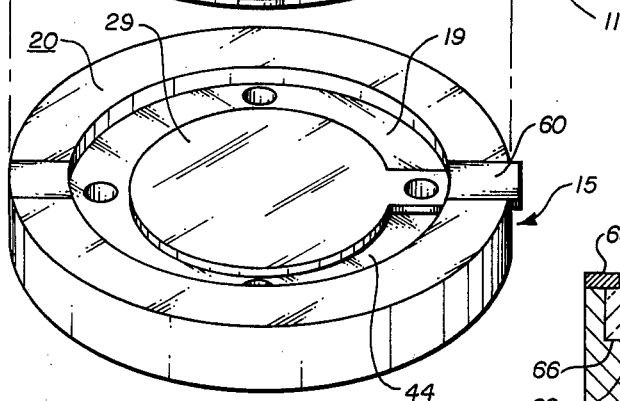
Fig. 2
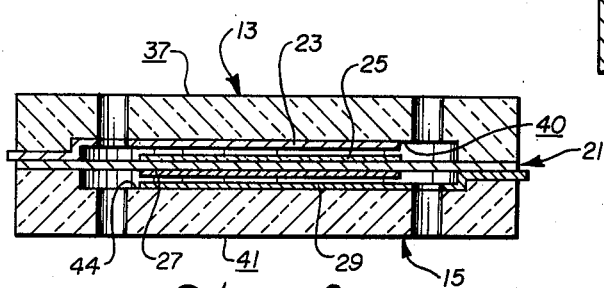
Fig. 4

DUAL CAPACITANCE TYPE BONDED PRESSURE TRANSDUCER

BACKGROUND OF THE INVENTION

This invention relates generally to pressure transducers and more particularly concerns a dual capacitance, bonded pressure transducer.

In certain applications, such as in the measurement of either dynamic and static pressures on aircraft, and in aircraft engines, there is a need for a pressure transducer which is physically small but capable of providing accurate results at elevated temperatures, i.e. up to 1,000° F. and higher, without auxiliary cooling devices.

Several types of pressure transducers have been tried in such circumstances, but all have proved unsuccessful, for various reasons. Many such transducers are susceptible to thermal gradients at elevated temperatures, which result in significant shifts in response of the transducer, particularly in the zero point. Other transducers are not capable of measuring both static and dynamic pressures, while still other transducers are too large in size for such applications, or require auxiliary cooling apparatus.

Generally, the capacitance type pressure transducer, since it does not need an auxiliary cooling device, might be expected to come closest to meeting the above specifications, but such transducers have the significant disadvantages of being subject to distortion caused by thermal gradients and are characterized by an output which is nonlinear with respect to change in pressure.

Hence, there are no currently available pressure transducers which provide accurate static and dynamic pressure measurements in an elevated temperature, space restricted environment.

Accordingly, it is a general object of the present invention to provide a pressure transducer which overcomes one or more of the disadvantages of the prior art noted above.

It is another object of the present invention to provide such a pressure transducer which is characterized by an output which is substantially linear with respect to pressure change.

It is a further object of the present invention to provide such a pressure transducer which has a relatively low susceptibility to thermal gradients.

It is another object of the present invention to provide such a pressure transducer which measures both static and dynamic pressure.

It is a still further object of the present invention to provide such a pressure transducer which is relatively small.

It is yet another object of the present invention to provide such a pressure transducer which does not require an auxiliary cooling device.

SUMMARY OF THE INVENTION

Accordingly, a pressure transducer is provided which includes first and second support means, and an intermediate thin diaphragm. Each support means has a recess defined in one surface thereof, thereby defining a support surface between the recess and the outer edge of the one surface of the support means. The diaphragm is supported between the support surfaces of the two support means. The first and second support means and the diaphragm all are comprised of the same material which is characterized by a low coefficient of thermal expansion. Further, the first and second support means and the diaphragm means are bonded together so that they are united in a dimensionally stable physical relationship. Capacitive plates are positioned on surfaces of the recesses in both support means, and on both surfaces of the diaphragm, thereby defining the first and second capacitors in the dual capacitance transducer.

DESCRIPTION OF THE DRAWINGS

A more thorough understanding of the invention may be obtained by a study of the following detailed description taken in connection with the accompanying drawings in which:

FIG. 1 is an exploded isometric view of the pressure transducer of the present invention.

FIG. 2 is a vertical cross-sectional view of the pressure transducer of FIG. 1.

FIG. 3 is a top plan view of the pressure transducer of FIG. 1.

FIG. 4 is a vertical cross-sectional view, showing a pressure transducer similar to that of FIG. 1 in a first casing environment.

DESCRIPTION OF THE PREFERRED EMBODIMENT

Figure 6:
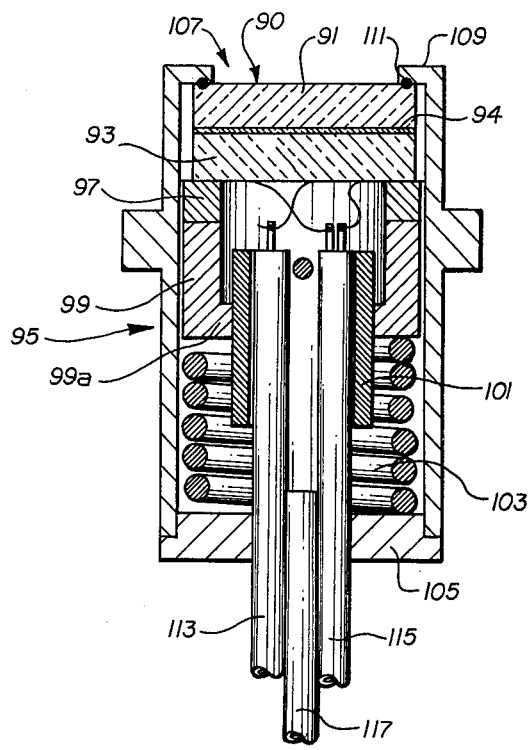
FIG. 6 is a vertical cross-sectional view of a pressure transducer similar to that of FIG. 1, shown in a second casing environment.

Referring to FIG. 1, the pressure transducer of the present invention is shown generally at 11. The transducer comprises, in a stacked sequence, support element 13, diaphragm 21 and support element 15. The two support elements 13 and 15 take the form of relatively thick discs. Support element 13 has a thin recess 17 in its lower surface, while support element 15 has a similar recess 19 in its upper surface. The two recesses 17 and 19 define support surfaces 18 and 20 of their respective support elements. The diaphragm 21, which is relatively thin compared to the support elements, is supported between the support surfaces 18 and 20. Support elements 13 and 15 and diaphragm 21 preferably all comprise fused quartz, which is primarily characterized by an extremely low coefficient of thermal expansion.

Metal plates, which function as capacitive plates, are positioned on both surfaces of diaphragm 21, and on both recess surfaces. A first capacitor includes plates 23 and 25, and a second capacitor includes plates 27 and 29. Leads are provided from each of the plates 23, 25, 27 and 29 to the exterior of the transducer, where connections are provided to electrical circuitry or similar means for detection of change of capacitance in the first and/or second capacitor.

In the embodiment shown, a reference pressure, which in some cases may be the atmospheric pressure, and the pressure to be measured are introduced through openings in both support elements 13 and 15. The resulting pressure, which is a differential pressure, will deflect diaphragm 21 in the direction of one support element or the other, depending on whether the reference pressure or the actual pressure is the larger of the two. The capacitance of the first capacitor will decrease when the capacitance of the second capacitor increases, and vice-versa. These capacitance values are detected and added algebraically, which results in a linear response of the transducer to change in pressure.

The material comprising support elements 13 and 15 is a fused quartz. This material is relatively well known and is characterized by a high softening temperature and a very low coefficient of thermal expansion, which makes it suitable for special uses at high temperature. It also is a good electrical insulator. The use of fused quartz for the diaphragm 21 and the support elements 13 and 15 greatly assists in the ability of the transducer of the present invention to operate accurately at elevated temperatures.

Referring now to FIGS. 1 and 2 in detail, the diaphragm 21 may, of course, be of different sizes depending upon the constraints of the application of the transducer. However, by way of example, in one embodiment, the diaphragm is 0.40 inches in diameter and is between 0.008 and 0.012 inches thick. The effective lower limit in the size of the diaphragm is determined by a number of factors. The thickness of the diaphragm must decrease as the diameter decreases, in order to maintain the same quality of transducer output. In addition, the surfaces of the diaphragm must have a high degree of surface uniformity in order to result in proper bonding to the support elements. This is more difficult to achieve with very thin diaphragms. Further, the physical configuration of the diaphragm is somewhat limited by the characteristics of the material comprising the diaphragm. In the case of fused quartz, for instance, which has a nominal fracture pressure of 5,000 psi, it would be difficult to have a diaphragm significantly thinner than 0.008 inches, because of the high potential for fracture.

Referring still to FIGS. 1 and 2 in detail, the two support elements 13 and 15 are almost identical in configuration. They are circular with a diameter approximately equal to the diameter of the diaphragm 21, which in the embodiment shown is 0.40 inches. Each support element 13 and 15 is in the form of a disc, approximately 0.08 inches thick, and is made entirely of fused quartz, the same material comprising diaphragm 21, as explained above. In the lower surface of upper support element 13 and in the upper surface of lower support element 15 are provided recesses 17 and 19, as explained above. For the support elements 13 and 15 of the embodiment shown, each recess 17 and 19 has a diameter of 0.32 inches and a depth of between 0.005 and 0.007 inches. This leaves edge surfaces 18 and 20, respectively, defined adjacent each recess.

Also provided in each support element is at least one, and in the embodiment shown, more than one, opening which extends between the recess in each support element and the outer, opposing surface of the support element. Referring now to FIGS. 1, 2 and 3, support element 13, which is exemplary, has four openings 31-34 therein which extend between the outer surface 37 of support element 13 and the recess surface 40. Likewise, similar openings extend between the outer surface 41 of support element 15 and its recess surface 44. Each opening in the support elements 13 and 15 is cylindrical in shape and approximately 0.04 inches in diameter. The four openings are located at 90° intervals and are centered on a circular line 39 having a radius of 0.13 inches, centered on the center 43 of the support element. The reference pressure and the pressure to be measured are directed through the four openings to the interior of the transducer. The diaphragm will move to the extent of the difference between the reference pressure and the pressure to be measured.

Referring now to FIGS. 1 and 2, the two support elements 13 and 15 and the diaphragm 21 are arranged so that the outer portion of the opposed surfaces of the diaphragm 21 fits between, and is supported fixedly by, the two support surfaces 18 and 20 of support elements 13 and 15. The diaphragm and the support surfaces are then bonded together, in a manner to be more fully explained hereinafter, in order to establish a firm, dimensionally stable, relationship between the various parts of the transducer.

The resulting structure is an enclosure of fused quartz having two interior chambers divided by a thin, movable diaphragm. Bonded to both surfaces of diaphragm 21, and recess surfaces 40 and 44, are thin metal plates 23, 25, 27 and 29, which form the capacitive plates of the transducer, as explained above.

In the embodiment shown, the capacitive plates 23, 25, 27 and 29 comprise platinum film, which is stable both electrically and structurally at high temperatures. For applications involving lower temperatures, however, other metals may be effectively used. The plates 23 and 29, respectively, cover a substantial portion of the area of recess surfaces 40 and 44, and in the embodiment shown, cover almost the entire recess surface area of their respective support elements. The relative dimensions and position of the capacitive plates, the recesses, and the openings in the support element are shown in FIG. 3.

It is generally desirable to make the plates 23, 25, 27, 29 quite large in comparison to the total area of the recess surfaces 40 and 44, although further increases in size beyond a certain point result in insignificant improvement in performance. The amplitude of the output of the transducer is a function of both the area of the plates and the amount of deflection of the diaphragm over that area. Hence, the size of the plates is important to transducer output. However, the maximum amount of deflection is at the center of the diaphragm, so that with an increase in size of the plates beyond a given point, the output of the apparatus will increase very little, because the deflection of the diaphragm over the additional area of the plate results in an output which is only slightly greater than the output for the previous plate size. For the configuration shown, the diameter of plates 23, 25, 27 and 29 is approximately 0.26 inches for maximum output of the transducer.

The capacitive plates 23, 25, 27 and 29 are, in the embodiment shown, vacuum deposited by a sputtering technique, which produces a layered, bonded plate which is capable of withstanding the high temperatures incurred by the transducer structure in the remainder of the manufacturing process and in use in elevated temperature environments.

In the embodiment shown, the plates are a thin film, approximately $8 \times 10^{-6}$ inches. Although the plates shown cover a large portion of the recess surfaces, there is a separation between the openings and the edge boundary of the capacitive plates. However, in some embodiments, the plates may actually extend to the openings, and in some cases, the openings may extend through the plates.

The deposition process of sputtering may be accomplished in a number of ways. One method involves the following steps: (1) sputter tantalum in the presence of oxygen at no bias, 5 microns of argon pressure and 2 microns oxygen pressure, with 300 watts of cathode power for 2.0 minutes; (2) sputter platinum at 10% bias and 7 microns of argon pressure, with 300 watts of cathode power for 1.0 minute; (3) sputter platinum at no bias, 7 microns of argon pressure, with 300 watts of cathode power for 3.25 minutes; (4) sputter tantalum in presence of oxygen at no bias, 5 microns of argon pressure, 2 microns of oxygen pressure, with 300 watts of cathode power for 6.0 minutes; and (5) sputter platinum at 10% bias, 7 microns of argon pressure, with 300 watts of cathode power for 2.0 minutes. Other sputtering methods, however, are known in the art and have been used successfully.

The resulting capacitive plates have the primary advantage of being both electrically and structurally stable at elevated temperatures, so that the remaining steps of the manufacturing process of the article can be carried out without harming the plates, or their bond to the support elements, and so that the article can operate in elevated temperatures.

Electrically conductive leads are provided from plates 23, 25, 27 and 29 to the exterior of the article, providing a connection capability to external circuitry. There are many possible ways of manufacturing the leads. In the embodiment of FIGS. 1, 2 and 3, the leads are vacuum deposited as part of the deposition of the capacitive plates. Each lead is thus a narrow, thin film band of platinum which extends from a capacitive plate to the edge of the transducer.

Referring to FIGS. 1 and 3 in particular, band 57 forms the lead which extends from capacitive plate 23 to the edge of support element 13; bands 58 and 59 form the leads which extend from plates 25 and 27 to the edge of diaphragm 21; and band 60 forms the lead which extends from plate 29 to the edge of support element 15.

The particular arrangement and position of the bands 57-60 are the choice of the designer, for convenience of connection to external circuitry. The bands 57-60 are thin film, approximately $8 \times 10^{-6}$ inches, the same thickness as the capacitive plates. If desirable, the bands 57-60 can be made thicker through additional vapor deposition. The bands usually extend just beyond the edge surface of the transducer in the form of a small tab. An external lead or other circuit connection may then be welded or connected in some other manner to the tabs.

The support elements 13 and 15 and diaphragm 21 are bonded together in order to provide a dimensionally stable transducer. This is important to maintain accuracy over a wide operating temperature range. The bonding material in one embodiment is a devitrified glass which is silk screened in a very thin layer, i.e. 25 microns, onto the support surfaces 18 and 20 of the support elements 13 and 15. A characteristic of devitrified glass is that it has been softened and then hardened, it will soften again only at a much elevated temperature over its original softening temperature. The bonding glass should have a relatively low coefficient of thermal expansion, similar to that of quartz, and should be capable of use with quartz.

The support elements with the silk screened glass and the diaphragm are then arranged as shown in FIG. 2 and the combination is placed in an oven, at approximately 1780° F. At this temperature, the glass melts and bonds the elements together, resulting in the desired dimensionally stable transducer. Other methods for bonding may be used, with different bonding materials. In some cases, it may even be possible to bond the elements together without a bonding material, i.e. by heating the article high enough so that the fused quartz of the support surfaces flows sufficiently to achieve a good bond with the diaphragm.

The invention is shown in a first operating embodiment in FIG. 4. The transducer 61 shown in FIG. 4 is identical to the article of FIGS. 1-3 with the exception that the upper support element 63 has a slightly larger diameter than lower support member 65. This permits the transducer to be supported by a shoulder 66 which forms a part of a casing which is shown generally at 67. Casing 67 is generally cylindrical in shape and open at one end, where the shoulder 66 is located. A ring-like keeper 69 extends around the periphery of casing 67 and mates with a small notch in the periphery of the upper surface of support member 63. Keeper 69 maintains the transducer in place against the shoulder 66. In some embodiments, a small airgap may exist between the edge of upper support element 63 and the inner wall of case 67. This can be packed with a quartz yarn.

At the other end of case 67 are provided openings for dual and single conductor metal sheathed electrical cables 71 and 73. The conductors in the conductor cables 71 and 73 are connected to connection points 72, 74 and 76.

Connecting leads (not shown) extend down the edge surface of the transducer from the exposed tabs of bands 57-60 to the connection points. Leads from the capacitive plates 81 and 83 in the support elements 61 and 65 are connected, respectively, to connection points 72 and 74, while leads from both capacitive plates 85 and 87 on diaphragm 68 are connected to connection point 76. The conductors in dual conductor cable 71 are connected, respectively, to connection points 72 and 74, while the conductor in the single conductor cable 73 is connected to connection point 76. The conductor cables extend out of the casing and the conductors therein may then be conveniently connected to external electronic circuitry which provides the actual readable output of the transducer.

Another opening is provided in the same end of casing 67 to allow for the insertion of a pipe 75, through which is applied the reference pressure. The pressure to be measured reaches the transducer from the other, open end of the casing.

In operation of the transducer, the pressure to be measured will be directed through openings 78 in support member 63 and will tend to force diaphragm 68 in a downward direction, toward support element 65, while the reference pressure will be directed through openings 77 and will tend to force diaphragm 68 upwardly, toward element 63. Hence, the diaphragm arrangement shown in FIG. 4 operates on a differential pressure basis. However, it should be understood that by changing the venting in an appropriate, known, way, an absolute transducer may also be provided.

Referring now to FIG. 6, a second casing embodiment for the pressure transducer of the present invention is shown. The pressure transducer 90, comprising support elements 91 and 93 and diaphragm 94, is supported within a generally cylindrical casing 95 by an alumina washer 97, which in turn is supported by a ring 99 which is somewhat L shaped in cross-section. The short leg 99a of the ring 99 is in turn secured to a central cylinder 101.

A coil spring 103, which rests on a bottom plate 105 of the casing 95, biases the combination of the central cylinder 101, ring 99 and washer 97 against the transducer 90, forcing it upwardly towards the open end 107 of the casing. The casing includes a shoulder 109 at the open end 107, with a gold O ring 111 positioned near the free edge of the shoulder in the lower surface thereof. The upper surface of support element 91 of transducer 90 bears against the gold O ring by virtue of the bias action of spring 103. Such an arrangement holds the pressure transducer securely within the casing 67.

Connections are then made from the capacitive plates of the pressure transducer to the conductors in conductor cables 113 and 115, as explained above with respect to the first casing embodiment. A pipe 117 permits access of the reference pressure to one side of diaphragm 94 while the other side of the diaphragm is exposed to the pressure to be measured, as explained above with respect to the embodiment of FIG. 4.

In operation of the differential transducer shown, the net difference pressure between the reference pressure and the pressure to be measured will cause a deflection of the diaphragm in the direction away from the source of the greater pressure.

Accordingly, the distance between the capacitive plate in the recess nearest the source of the greater pressure and its associated capacitive plate on the diaphragm will increase. For instance, referring to FIG. 4, if the pressure through pipe 75 is larger than the pressure to be measured, the diaphragm 68 will move upwardly, resulting in an increase in spacial distance between plates 83 and 87, and a corresponding decrease in capacitance between those plates. Correspondingly, the distance between plates 81 and 85 will decrease, resulting in an increase in capacitance between those plates.

The dual capacitance arrangement, in which the capacitance of one capacitor is increasing while the capacitance of the other capacitor is decreasing, substantially improves the linearity of the transducer. Single capacitance transducers are not linear because the change in capacitance of a single capacitor is not linear with respect to the change in distance between the plates of the capacitor, and hence is likewise not linear with respect to change in pressure. A variable compensation or scale factor thus must be used with the capacitance information obtained from single capacitance transducers to obtain accurate results therefrom.

However, in the dual capacitive arrangement shown and described herein the non-linearity of one capacitor in the apparatus as it increases in capacitance is almost a mirror-image of the non-linearity of the other capacitor as it decreases in capacitance. When the two values of capacitance are added together algebraically, the non-linear characteristics of each value tend to cancel, producing an almost linear response of net capacitance change relative to change in pressure.

Figure 5:
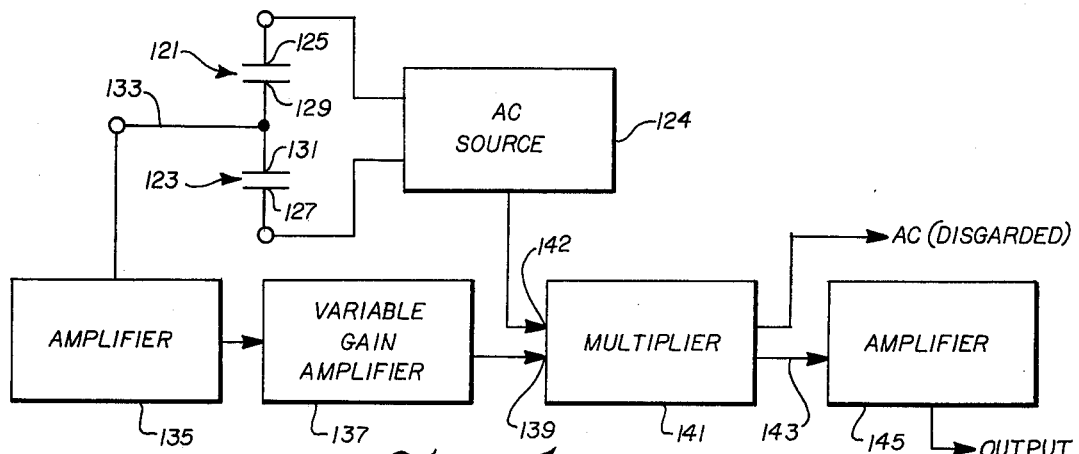
FIG. 5 is a simplified block diagram of the electronic circuitry used with the transducer of FIG. 1.

The actual readable signal output of the transducer is supplied by a conventional signal conditioning circuit which accompanies such transducers. The signal conditioning circuit forms no part of the present invention. A simple block diagram of such a circuit and its interface with the pressure transducer of the present invention is shown in FIG. 5. The two capacitors 121 and 123 of the transducer are connected as one-half of a bridge. An AC exitation voltage from a source 124 is applied to the plates 125 and 127 in the recesses of the support elements. An output signal is measured at a common point between the capacitive plates 129 and 131, which are located on the diaphragm of the transducer.

The signal from source 124 is a precise amplitude sin wave. The output signal, on line 133, is then applied to a signal amplifier 135. The output from amplifier 135 is then applied to a variable gain amplifier 137, the output of which is applied to one input 139 of a conventional multiplier 141. The signal from AC source 124 is applied to the other input 142 of multiplier 141. The multiplier 141 has two outputs: an AC output, which is discarded, and a DC output on line 143 which, after being amplified by amplifier 145, forms the readable output of the transducer.

The DC signal from multiplier 141 is proportional to the product of the amplitudes of the two AC signals present at inputs 139 and 142. Since the amplitude of the AC signal from the AC source 124 is constant, the amplitude of the DC output signal on line 143 is proportional to the amplitude of the output signal from the pressure transducer on line 133. This DC signal on line 143 thus is proportional to the change in net capacitance of the pressure transducer and hence, is also proportional to the pressure being measured. Scaling factors may then be utilized so that the actual value of the pressure being measured may be recorded or displayed to an operator.

Hence, a capacitance pressure transducer has been described herein which is capable of providing accurate results in extreme temperature environments, without the need for an auxiliary cooling apparatus. This is accomplished by the combination of a thin, disc-type diaphragm supported between two support elements, which are constructed of fused quartz and are bonded together in a dimensionally stable relationship. Capacitive plates are provided in recesses on both the support elements and on both sides of the diaphragm. Thin film leads extend between the capacitive plates and the exterior of the transducer, providing a connection capability to the associated electronic circuitry.

Although an exemplary embodiment of the present invention has been disclosed herein for purposes of illustration, it will be understood that various changes, modifications, and substitutions may be incorporated in such embodiment without departing from the spirit of the invention, which is defined by the claims which follow.

What is claimed is:

1. A pressure transducer, comprising:
   first support means of fused quartz having a first recess defined in one surface thereof, thereby defining a first support surface, between said first recess and the outer edge of the one surface of said first support means;
   a first capacitive plate positioned on a surface of said first recess;
   second support means of fused quartz having a second recess defined in one surface thereof, thereby defining a second support surface, between said second recess and the outer edge of the one surface of said second support means;
   a second capacitance plate positioned on a surface of said second recess;
   diaphragm means of fused quartz fixedly supported about its edge between the first and second support surfaces of the first and second support means, respectively;
   third and fourth capacitive plates positioned on the opposing surfaces of said diaphragm means; and
   means bonding said diaphragm means to said first and second support surfaces, wherein said bonding means has such a thermal coefficient of expansion and such a bonding temperature and is in the form of a layer which is sufficiently thin that said first and second support means and said diaphragm means are fused together by said bonding means into an integral body, without disturbing the desired physical relationship of said first and second support means and said diaphragm means during bonding.

2. The apparatus of claim 2, wherein said first and second support surfaces are continuous.

3. The apparatus of claim 2, wherein both said first and second support means include, respectively, at least one opening which extends between the exterior of said respective first and second support means and the respective first and second recesses therein.

4. The apparatus of claim 2, wherein said first, second, third and fourth capacitive plates are relatively thin compared to the depth of said first and second recesses.

5. The apparatus of claim 4, wherein said first, second, third and fourth capacitive plates are deposited by sputtering.

6. The apparatus of claim 4, wherein said first, second, third and fourth capacitive plates are on the order of $8 \times 10^{-6}$ inches thick.

7. An article of claim 2, including first, second, third and fourth electrically conductive leads, which are approximately the same thickness as said capacitive plates, and extend, respectively, between each of said capacitive plates and the exterior of the article.

8. An article of claim 7, including conductor means for connecting said leads to external circuitry, wherein said conductor means includes a double conductor sheath cable and a single conductor sheath cable, wherein the conductors in said double conductor cable are connected to the leads from said first and second capacitive plates, and wherein the conductor in said single conductor cable is connected to a common point of the leads from the third and fourth capacitive plates.

9. An article of claim 8, including a housing for said transducer, said housing being open at one end and including means for supporting said transducer within said housing, wherein said housing further includes openings in the other end thereof for routing said conductor means into said housing.

10. An apparatus of claim 1, wherein said first and second support means are in the form of discs, wherein the depth of said first and second recesses in said discs are relatively small compared to the thickness of said discs, and wherein said diaphragm means is relatively thin compared to the thickness of said discs.

11. An article of claim 10, wherein said first and second recesses are between 0.005 and 0.007 inches deep and said diaphragm is between 0.008 and 0.012 inches thick.

12. An article of claim 11, wherein said first and second support surfaces have a width which is approximately 10% of the diameter of the surface in which said first and second recesses are defined.

13. An apparatus of claim 1, wherein said bonding means is a devitrified glass characterized by a relatively low initial bonding temperature and by a relatively high melting point following the initial bonding.

* * * * *